US006867263B2

(12) United States Patent
Kanbe

(10) Patent No.: US 6,867,263 B2
(45) Date of Patent: Mar. 15, 2005

(54) METHOD OF VULCANIZED BONDING OF HEAT-RESISTANT RUBBER

(75) Inventor: Shinobu Kanbe, Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/393,928

(22) Filed: Mar. 20, 2003

(65) Prior Publication Data

US 2003/0187146 A1 Oct. 2, 2003

(30) Foreign Application Priority Data

Mar. 28, 2002 (JP) ........................................ 2002-090717

(51) Int. Cl.⁷ ............................................. C08F 236/12
(52) U.S. Cl. .............................. 525/329.3; 525/329.1; 525/329.2; 525/330.3; 525/232; 525/222; 525/238; 524/432; 524/433; 524/430
(58) Field of Search ................................. 525/232, 227, 525/332.5; 524/433, 432, 236; 428/521

(56) References Cited

U.S. PATENT DOCUMENTS

| | | | | | |
|---|---|---|---|---|---|
| 3,910,866 | A | * | 10/1975 | Morris | 525/329.5 |
| 4,904,736 | A | * | 2/1990 | Shimizu et al. | 525/279 |
| 5,051,480 | A | * | 9/1991 | Coran | 525/227 |
| 5,158,113 | A | * | 10/1992 | Ozawa et al. | 138/137 |
| 5,362,533 | A | * | 11/1994 | Fukuda et al. | 428/36.8 |
| 5,795,635 | A | * | 8/1998 | Iwasaki | 428/36.3 |
| 6,087,453 | A | * | 7/2000 | Nishimura | 525/329.2 |
| 6,388,015 | B1 | * | 5/2002 | Aimura et al. | 525/194 |
| 6,576,311 | B2 | * | 6/2003 | Noguchi et al. | 428/36.91 |
| 2003/0187146 | A1 | * | 10/2003 | Kanbe | 525/329.1 |
| 2003/0188793 | A1 | * | 10/2003 | Kanbe et al. | 138/126 |

FOREIGN PATENT DOCUMENTS

| | | | |
|---|---|---|---|
| EP | 0 365 927 A2 | 5/1990 | |
| EP | 0 419 218 B1 | 3/1991 | |
| EP | 0 962 311 A1 | 12/1999 | |
| JP | 2-107657 | * 4/1990 | ........... C08L/33/04 |
| JP | 09-112756 A1 | 5/1997 | |
| JP | 09-124845 A1 | 5/1997 | |
| JP | 11-028788 A1 | 2/1999 | |
| JP | 11-028788 | * 2/1999 | ........... B32B/25/04 |
| JP | 11-325332 A1 | 11/1999 | |
| JP | 2001-279021 A1 | 10/2001 | |

OTHER PUBLICATIONS

Searching PAJ; Patent Abstracts of Japan; Publication No. 09–112756 (English translation of the abstract).
Searching PAJ; Patent Abstracts of Japan; Publication No. 09–124845 (English translation of the abstract).
Searching PAJ; Patent Abstracts of Japan; Publication No. 11–028788 (English translation of abstract).
Searching PAJ; Patent Abstracts of Japan; Publication No. 11–325332 (English translation of abstract).
Search PAJ; Patent Abstracts of Japan; Publication No. 2001–279021 (English translation of the abstract).

* cited by examiner

Primary Examiner—David W. Wu
Assistant Examiner—Rip A Lee
(74) Attorney, Agent, or Firm—Darby & Darby

(57) ABSTRACT

The present invention provides a method of vulcanized bonding of heat resistant rubber. Vulcanized bonding of a hydrogenated acrylonitrile butadiene rubber (H-NBR) and an acrylic rubber (ACM) comprises a step for mixing zinc oxide (ZnO) and magnesium oxide (MgO) as acid acceptors into non-vulcanized H-NBR; and a step for the peroxide vulcanization of the H-NBR at the same time as the vulcanized bonding of the ACM, which is of an epoxy cross-linking type. Thus, hydrogenated acrylonitrile butadiene rubber (H-NBR) and acrylic rubber (ACM) are vulcanized bonded securely while also providing heat resistance.

18 Claims, No Drawings

METHOD OF VULCANIZED BONDING OF HEAT-RESISTANT RUBBER

BACKGROUND OF THE INVENTION

1. Field of the Invention

The present invention provides a method of vulcanized bonding of heat-resistant rubber. More specifically, the present invention provides a method of vulcanized bonding of heat-resistant rubber to achieve strong vulcanized bonding of hydrogenated acrylonitrile butadiene rubber (H-NBR) and acrylic rubber (ACM) while providing adequate heat resistance and wear resistance.

2. Description of the Related Art

In recent years, there has been a demand for fuel hoses with heat resistance and fuel resistance. For example, due to exhaust gas countermeasures, front wheel drive, and the like, the temperature inside the engine housing of automobiles has become more severe. Due to the advances of low fuel consumption, there has been a dramatic rise in the level of heat resistance demanded by the peripheral parts of diesel engines. As a result, diesel fuel hoses, for example, require high heat resistance at around 150° C. for 500 hours.

Methods of using acrylonitrile butadiene rubber (NBR) or acrylic rubber (ACM) in the inner pipe of the fuel hose do not always adequately satisfy the heat resistance and fuel resistance requirements. These methods are particularly inadequate for diesel fuel hoses. Adequate heat and fuel resistance is achieved by using fluorine rubber (FKM). However, FKM is very expensive, and there are problems with inadequate cold resistance and the inadequate workability of the non-vulcanized molded body.

On the other hand, of the nitrile rubbers, H-NBR has excellent heat resistance, fuel resistance, and cold resistance. The butadiene units of NBR are completely or partially hydrogenated in H-NBR. Although H-NBR is relatively expensive, the cost is more reasonable compared to FKM. By using the relatively expensive H-NBR in the inner layer of the inner pipe of the hose and by using an inexpensive rubber having some heat resistance and fuel resistance (such as ACM, preferably) for the outer layer of the inner pipe of the hose, the inner layer of the inner pipe of the hose can be thinner. The amount of H-NBR is reduced, and this construction is more practical.

References such as Japanese Laid-Open Patent Publication No. 9-124845, Japanese Laid-Open Patent Publication No. 9-112756, and Japanese Laid-Open Patent Publication No. 2001-279021 disclose hoses using H-NBR mixtures and H-NBR mixtures for use in hoses and the like. In addition, Japanese Laid-Open Patent Publication No. 11-325332 discloses a hose having an innermost layer of H-NBR and an outer layer of ACM which is vulcanized and molded to form a unitary body.

When constructing a heat resistant fuel hose having a rubber inner pipe with an inner layer of H-NBR and an outer layer of ACM in the inner pipe, the inner layer in the inner pipe needs to be securely bonded with the outer layer in the inner pipe, preferably by vulcanized bonding. At the same time, there is also a need to improve the heat resistance of the rubber inner pipe as much as possible.

Japanese Laid-Open Patent Publication No. 9-124845, Japanese Laid-Open Patent Publication No. 9-112756, and Japanese Laid-Open Patent Publication No. 2001-279021 described above disclose ways to improve the H-NBR mixtures according to each of their technical objectives. Ways to improve heat resistance in general are also disclosed in these references. However, the references do not disclose ways to improve bonding between H-NBR and ACM while simultaneously improving the heat resistance of H-NBR.

Japanese Laid-Open Patent Publication No. 11-325332 described above discloses a hose having vulcanized bonding between the H-NBR layer and the ACM layer by peroxide vulcanization of H-NBR. The peroxide vulcanization is considered to be beneficial for improving the heat resistance of H-NBR. However, according to the research of the present inventor, the carboxyl group cross-linking type of ACM used in the disclosed invention does not always achieve strong vulcanized bonding with H-NBR. In addition, the method of peroxide vulcanization of H-NBR does not particularly improve the bonding of the two layers.

Furthermore, although the mixing of silica filler into H-NBR may improve the vulcanized bonding with the adjacent ACM layer, the workability of the non-vulcanized molded body remains inadequate.

SUMMARY OF THE INVENTION

The present invention provides a method of secure vulcanized bonding of H-NBR and ACM while providing heat resistance and wear resistance.

An embodiment of the present invention provides a method of vulcanized bonding of heat-resistant rubber. The method of vulcanized bonding of a hydrogenated acrylonitrile butadiene rubber (H-NBR) and an acrylic rubber (ACM) comprises a step for mixing zinc oxide (ZnO) and magnesium oxide (MgO) as acid acceptors into non-vulcanized H-NBR; and a step for simultaneously performing peroxide vulcanization of H-NBR and vulcanized bonding of ACM of an epoxy cross-linking type.

The method of vulcanized bonding of heat resistant rubber according to the embodiment described above involves the vulcanized bonding of H-NBR, which has excellent heat resistance, fuel resistance, cold resistance, and the like, with ACM, which has a constant heat resistance and fuel resistance and is relatively inexpensive. Thus, the present invention provides a layered heat resistant rubber with excellent heat resistance, fuel resistance, and the like without too much added expense. Furthermore, due to the peroxide vulcanization of the H-NBR, heat resistance is improved even more.

Additionally, ZnO and MgO, which are acid acceptors, are mixed with the H-NBR, which is to be peroxide vulcanized, and the ACM, which is to be vulcanized bonded with H-NBR, is an epoxy cross-linking type of ACM. Thus, H-NBR and ACM are securely vulcanized bonded. Although the reason for this is still not clear, the inventor suspects that the MgO, which is an acid acceptor, forms a pseudo-cross link with the epoxy cross-link type ACM, thereby increasing the bonding strength. By also using ZnO, which is also an acid acceptor, a good compression set resistance is achieved.

Japanese Laid-Open Patent Publication No. 9-124845 mentioned above discloses a step for mixing ZnO or MgO into H-NBR. Additionally, Japanese Laid-Open Patent Publication No. 2001-279021 discloses an embodiment in which ZnO and MgO are mixed into H-NBR. However, these references disclose mixtures which are unrelated to the vulcanized bonding of H-NBR and ACM and do not disclose the contribution of these acid acceptors to the vulcanized bonding of H-NBR and ACM.

According to another embodiment of the present invention, the mixing amount of ZnO into H-NBR as described above is 2 phr (weight parts per hundred weight parts of rubber) or greater and the mixing amount of MgO is 4 phr or greater.

Although the mixing amount of ZnO and MgO in H-NBR is not restricted, the mixing amount of ZnO is preferably 2 phr or greater and the mixing amount of MgO is preferably 4 phr or greater. When the mixing amount of MgO is less than 4 phr, the strength of the vulcanized bond with ACM may be inadequate from a practical standpoint. Additionally, when the mixing amount of ZnO is less than 2 phr, the compression set resistance of H-NBR may be inadequate from a practical standpoint.

According to another embodiment of the present invention, the mixing amount of ZnO in H-NBR as described above is 2–10 phr, and the mixing amount of MgO is 4–15 phr.

More preferably, the mixing amounts of ZnO and MgO in H-NBR are 2–10 phr for ZnO and 4–15 phr for MgO. If there is an amount of ZnO and MgO outside of this range, the workability or the like of the non-vulcanized molding body may be unsatisfactory.

According to another embodiment of the present invention, a vulcanizing agent or vulcanization accelerator such as ammonium salt is mixed into the ACM described above.

When ammonium salt is mixed into ACM as the vulcanizing agent or vulcanization accelerator as described above, the vulcanized bond strength of the ACM and H-NBR is further improved. The improvement is most likely the result of an increased speed of vulcanization.

According to another embodiment of the present invention, the vulcanizing agent or vulcanization accelerator described above is a compound or compound group of one of the following (1)–(3) or a combination of two or more of any of (1)–(3):

(1) ammonium benzoate;

(2) isocyanuric acid, quaternary ammonium salt, and diphenyl urea; and (3) imidazole, thiourea, and quaternary ammonium salt.

Although the type of vulcanizing agent or vulcanization accelerator used as described above is not restricted, it is preferably a compound or compound group in one of (1)–(3) or a combination of two or more of any of (1)–(3).

According to another embodiment of the present invention, H-NBR and ACM described above are used in the inner pipe of a hose as a laminated body with an inner layer of H-NBR and an outer layer of ACM.

When H-NBR and ACM are used in the inner pipe of a hose as a laminated body with an inner layer of H-NBR and an outer layer of ACM, excellent heat resistance, oil resistance, fuel resistance, and the like are provided, thereby resulting in an extremely good heat resistant hose having a rubber inner pipe in which the inner layer and outer layer have a secure vulcanized bond.

According to another embodiment of the present invention, the hose described above is a fuel hose, oil hose, or air hose.

The heat resistant hose described above has various uses and is not restricted to any particular use. However, as described above, because the inside of the engine housing of an automobile experiences extremely hot temperatures due to exhaust gas countermeasures, front wheel drive, and the like, the hose is preferably a fuel hose. Because of its heat resistance and oil resistance, the hose can also be an oil hose or an air hose.

According to another embodiment of the present invention, the fuel hose described above is a diesel fuel hose.

The fuel hose described above is especially useful as a diesel fuel hose for use in diesel engines. There has been a dramatic increase in the level of heat resistance demanded of the peripheral parts of diesel engines due to designs for low fuel consumption and the like.

The above and other advantages of the invention will become more apparent in the following description.

DETAILED DESCRIPTION OF THE INVENTION

Method of Vulcanized Bonding of Heat Resistant Rubber

The present invention provides a method for vulcanized bonding of hydrogenated acrylonitrile butadiene rubber (H-NBR) and acrylic rubber (ACM). Zinc oxide (ZnO) and magnesium oxide (MgO) are mixed into H-NBR as acid acceptors, and H-NBR is peroxide vulcanized. At the same time, ACM of an epoxy cross-linking type is vulcanized bonded to H-NBR. More preferably, H-NBR and ACM are vulcanized bonded as a layered body which is flat, tube-shaped, or the like to construct a vulcanized-bonded layered body of this shape. When constructing a tube-shaped vulcanized-bonded layered body, it is preferable to have H-NBR as the inner layer and ACM as the outer layer.

H-NBR

H-NBR used in the present invention is an unsaturated nitrile-conjugated diene copolymer rubber which is completely or partially hydrogenated. The H-NBR in the present invention comprises (a) a unit portion of unsaturated nitrile, (b) a unit portion of conjugated diene, and (c) a unit portion in which a unit portion of an ethylene unsaturated monomer other than unsaturated nitrile and/or the unit portion of conjugated diene is hydrogenated. The composition ratio of H-NBR for (a) the unit portion of unsaturated nitrile, (b) the unit portion of conjugated diene, and (c) the unit portion comprising the hydrogenated unit portion of an ethylene unsaturated monomer other than unsaturated nitrile and/or the unit portion of conjugated diene is not restricted. However, with respect to heat resistance, fuel resistance, oil resistance, and cold resistance, a copolymer rubber with 25–45% by weight of the unit portion of unsaturated nitrile, 5% by weight or less of the unit portion of conjugated diene, and 50–75% by weight of the unit portion of the hydrogenated unit portion of an ethylene unsaturated monomer other than unsaturated nitrile and/or the unit portion of conjugated diene is preferred.

ZnO and MgO are both mixed into H-NBR as acid acceptors. For the reasons stated above, the mixing amount of ZnO is preferably 2 phr or greater, and the mixing amount of MgO is 4 phr or greater. More preferably, the upper limit for the mixing amount of ZnO is 10 phr, and the upper limit for the mixing amount of MgO is 15 phr. In addition, the total mixing amount for ZnO and MgO is preferably in the range of 6–15 phr.

With respect to heat resistance, H-NBR is peroxide vulcanized and except for the acid acceptors described above, the types of vulcanization compounding ingredients are not restricted. Preferably, organic peroxide vulcanization is conducted. Any organic peroxide can be selected and used. For example, various monoperoxy compounds or diperoxy compounds can be used individually or two or more types can be used together.

Monoperoxy compounds include dicumyl peroxide, diacyl peroxide (for example benzoyl peroxide), di-t-butyl peroxide, t-butyl peroxide acetate, t-butyl peroxy isopropyl carbonate, peroxy ester (for example, t-butyl peroxy benzoate), and the like. Diperoxy compounds include 2,5-dimethyl-2,5-di-(t-butyl peroxy)-hexyne-3,2,5-dimethyl-2, 5-di-(t-butyl peroxy)-hexane, α,α'-bis(t-butyl peroxy)-p-diisopropyl benzene, 2,5-dimethyl-2,5-di-(benzoyl peroxy)-hexane, and the like.

The mixing amount of the organic peroxide will depend on the type of the organic peroxide. For example, when dicumyl peroxide is used by itself, approximately 0.5–8 phr is preferred. The mechanical strength of H-NBR may be inadequate when the mixing amount of dicumyl peroxide is less than 0.5 phr. If the mixing amount of dicumyl peroxide exceeds 8 phr, the non-vulcanized molded body may be easily scorched.

Furthermore, silica fillers, age resistors, carbon black, plasticizers, co-crosslinking agents (for example, TAIC and TMPTMA), and the like can be mixed with H-NBR, as needed.

ACM

Acrylic rubber (ACM) used in the present invention is an epoxy cross-linking type of ACM. "Acrylic rubber" is a general term encompassing acryl rubber and blend rubbers of this and other types of rubber.

Examples of epoxy cross-linking type ACM include various monomer compositions formed by copolymerization of any monomer selected from the following monomer group 1 through monomer group 11 and any monomer selected from the following epoxy cross-linking monomer groups:

Monomer group 1: Methyl acrylate, ethyl acrylate, n-propyl acrylate, isobutyl acrylate, n-butyl acrylate, n-pentyl acrylate, n-hexyl acrylate, n-octyl acrylate, or 2-ethyl hexyl acrylate.

Monomer group 2: Alkoxy alkyl acrylate group. For example, 2-methoxy ethyl acrylate, 2-ethoxy ethyl acrylate, 2-(n-propoxy)ethyl acrylate, 2-(n-butoxy)ethyl acrylate, 3-methoxy propyl acrylate, 3-ethoxy propyl acrylate, 2-(n-propoxy)propyl acrylate, or 2-(n-butoxy)propyl acrylate.

Monomer group 3: Fluorine containing acrylate group. For example, 1,1-dihydro perfluoro ethyl (meta)acrylate, 1,1-dihydro perfluoro propyl (meta)acrylate, 1,1,5-trihydro perfluoro hexyl (meta)acrylate, 1,1,2,2-tetrahydro perfluoro propyl (meta)acrylate, 1,1,7-trihydro perfluoro heptyl (meta)acrylate, 1,1-dihydro perfluoro octyl (meta)acrylate, or 1,1-dihydro perfluoro decyl (meta) acrylate.

Monomer group 4: Hydroxyl group containing acrylate group. For example, 1-hydroxy propyl (meta)acrylate, 2-hydroxy propyl (meta)acrylate, or hydroxy ethyl (meta) acrylate.

Monomer group 5: Tertiary amino group containing acrylate group. For example, diethyl amino ethyl (meta)acrylate or dibutyl amino ethyl (meta)acrylate.

Monomer group 6: Methacrylate group. For example, methyl methacrylate or octyl methacrylate.

Monomer group 7: Alkyl vinyl ketone group. For example, methyl vinyl ketone.

Monomer group 8: Vinyl and allyl ether group. For example, vinyl ethyl ether or allyl methyl ether.

Monomer group 9: Vinyl aromatic compound group. For example, styrene, α-methyl styrene, chlorostyrene, or vinyl toluene.

Monomer group 10: Vinyl nitryl group. For example, acrylonitrile or methacrylonitrile.

Monomer group 11: Ethylene unsaturated compound group. For example, ethylene, propylene, vinyl chloride, vinylidene chloride, vinyl fluoride, vinylidene fluoride, vinyl propionate, or alkyl fumarate.

Epoxy cross-linking monomer group: For example, glycidyl acrylate, allyl glycidyl ether, or methaallyl glycidyl ether.

A vulcanizing agent or vulcanization accelerator such as an ammonium salt is preferably mixed into the ACM. When ammonium salt is used as a vulcanizing agent or vulcanization accelerator, a compound or compound group as related to one of the following (1)–(3) or a combination of two or more of any of (1)–(3) is preferable:

(1) ammonium benzoate;
(2) isocyanuric acid, quaternary ammonium salt, and diphenyl urea; and
(3) imidazole, thiourea, and quaternary ammonium salt.

The mixing amount of ammonium salt with respect to ACM is not restricted. However, the mixing amount of ammonium salt is preferably approximately 0.1–3 phr. When the amount of ammonium salt is below this range, there may be slightly reduced bonding with ACM. When the amount of ammonium salt exceeds this range, the workability of the non-vulcanized molded body may be reduced and the non-vulcanized molded body may become easily scorched.

In addition, small amounts of silica fillers can be mixed into ACM. Age resistors, carbon black, plasticizers, processing aids (paraffin, for example), and the like are added, as needed.

Vulcanized-Bonded Layered Body and Hose

The uses for the vulcanized-bonded layered body constructed by the method of vulcanized bonding of a heat resistant rubber as described above are not restricted. However, the layered body, which has an inner layer of H-NBR and an outer layer of ACM, is preferably used as the inner pipe of a hose. The inner pipe is the innermost layer of the hose.

The construction of the entire hose is not restricted provided the inner pipe of the hose is constructed with the layered body as described above. For example, a reinforcement thread layer (or reinforcement wire layer) of any substance, a rubber layer, a resin layer, and the like can be included in any sequence on the outer perimeter of the rubber inner pipe. More preferably, a reinforcement thread layer and a rubber outer pipe are provided sequentially on the outer perimeter of the rubber inner pipe. The rubber outer pipe can be constructed by any type of rubber. However, examples of the type of rubber used in the rubber outer pipe include ACM, acrylonitrile butadiene rubber (NBR), blend material of NBR and polyvinyl chloride (NBR-PVC), ethylene propylene diene rubber (EPDM), ethylene propylene rubber (EPM), chlorinated polyethylene rubber (CM), chlorosulfonated polyethylene rubber (CSM), chloroprene rubber (CR), or blend rubber of two or more types selected from these types of rubber.

There are no restrictions on the use of the hose having the vulcanized-bonded layered body described above as the inner pipe of the hose. However, the hose is preferably used when heat resistance and a secure bond between the H-NBR layer and the ACM layer are required. The hose is also suitable when oil resistance and fuel resistance are required. Suitable examples of these types of hoses include a fuel hose, a oil hose, an air hose, or the like. Diesel fuel hoses and oil hoses are especially preferred.

DETAILED DESCRIPTION OF THE PREFERRED EMBODIMENTS

Preparation of H-NBR Non-Vulcanized Compositions, NBR Non-Vulcanized Compositions, and ACM Non-Vulcanized Compositions Table 1 shows H-NBR non-vulcanized compositions and NBR non-vulcanized compositions, which were prepared using an open roll, according to the proportions shown in columns A–F. Table 2 shows ACM non-vulcanized compositions, which were prepared using an open roll, according to the proportions shown in columns 1–6. The numerical values in Tables 1 and 2 indicate the number of parts by weight.

TABLE 1

|  | A | B | C | D | E | F |
|---|---|---|---|---|---|---|
| Zetpol 2000 | 100 | 100 | 100 | 100 | 100 | — |
| Nipol DN202 | — | — | — | — | — | 100 |
| Zinc oxide | 5 | 5 | 2 | 5 | — | 5 |
| Magnesium oxide | 5 | 10 | 2 | — | 5 | 5 |
| FEF Carbon | 50 | 50 | 50 | 50 | 50 | 50 |
| Plasticizer | 20 | 20 | 20 | 20 | 20 | 20 |
| TAIC | 2 | 2 | 2 | 2 | 2 | 2 |
| Dicumyl peroxide | 4 | 4 | 4 | 4 | 4 | 4 |

TABLE 2

|  | 1 | 2 | 3 | 4 | 5 | 6 |
|---|---|---|---|---|---|---|
| Nipol AR53 | 100 | 100 | 100 | 100 | 100 | — |
| Vamac G | — | — | — | — | — | 100 |
| Stearic acid | 1 | 1 | 1 | 1 | 1 | 1 |
| HAF Carbon | 60 | 60 | 60 | 60 | 60 | 60 |
| Plasticizer | 10 | 10 | 10 | 10 | 10 | 10 |
| Ammonium benzoate | 1.5 | — | — | — | — | — |
| Isocyanuric acid | — | 0.6 | — | — | — | — |
| Quaternary ammonium salt | — | 1.8 | 0.5 | — | — | — |
| Diphenyl urea | — | 1.3 | — | — | — | — |
| Imidazole | — | — | 0.5 | 0.5 | — | — |
| Trimethyl thio urea | — | — | 0.3 | — | — | — |
| Hexamethylene diamine carbamate | — | — | — | — | 1.5 | 1.5 |
| Diortho tolyl guanidine | — | — | — | — | 4 | 4 |

In Table 1, Zetpol 2000 is an H-NBR manufactured by Nippon Zeon Company, and Nipol DN202 is an NBR manufactured by Nippon Zeon Company. In Table 2, Nipol AR53 is an epoxy cross-linking type ACM manufactured by Nippon Zeon Company, and Vamac G is a carboxyl cross-linking type ACM manufactured by the DuPont Company.

Creation of a Vulcanized-Bonded Layered Body

The H-NBR non-vulcanized compositions or NBR non-vulcanized compositions mixed according to columns A–F of Table 1 and the ACM non-vulcanized compositions mixed according to columns 1–6 of Table 2 are each molded into a sheet which is 2 mm thick. Table 3 compares the method for producing the layered bodies of Embodiments 1–4 and Comparative Examples 1–7. Embodiments 1–4 and Comparative Examples 1–7 are prepared as shown in the "H-NBR or NBR" column and the "Acrylic Rubber" column. The H-NBR non-vulcanized composition sheet or NBR non-vulcanized composition sheet is layered with the ACM non-vulcanized composition sheet in order to construct the layered bodies of Embodiments 1–4 and Comparative Examples 1–7.

TABLE 3

|  | Material Construction | | Vulcanized Bonding Properties | | Heat Resistance of Layered Body | Compression Set of H-NBR or NBR |
|---|---|---|---|---|---|---|
|  | H-NBR or NBR | Acrylic Rubber | Bonding Strength (N/25 mm) | Surface Conditions |  | % |
| Embodiment 1 | A | 2 | 70 | rubber damage | ○ | 36 | ○ |
| Embodiment 2 | B | 2 | 90 < (tear) | rubber damage | ○ | 29 | ○ |
| Embodiment 3 | B | 1 | 60 | rubber damage | ○ | 29 | ○ |
| Embodiment 4 | B | 3 | 85 | rubber damage | ○ | 29 | ○ |
| Comparative Example 1 | C | 2 | 30 | surface peeling | ○ | 30 | ○ |
| Comparative Example 2 | D | 2 | 24 | surface peeling | ○ | 31 | ○ |
| Comparative Example 3 | E | 2 | 63 | rubber damage | ○ | 72 | X |
| Comparative Example 4 | F | 2 | 90 < (tear) | rubber damage | X | 100 | X |
| Comparative Example 5 | B | 4 | 29 | surface peeling | ○ | 29 | ○ |
| Comparative Example 6 | B | 5 | 10 | surface peeling | ○ | 29 | ○ |
| Comparative Example 7 | B | 6 | 12 | surface peeling | ○ | 29 | ○ |

The division between "Embodiment" and "Comparative Example" in Table 3 is only used for relative convenience. There are comparative examples shown in Table 3 that can be embodiments of the present invention.

After conducting press vulcanization at 160° C. for 45 minutes on the layered bodies, hot air vulcanization at 160° C. for 8 hours is conducted. As a result, the H-NBR sheet or NBR sheet and the ACM sheet were vulcanized bonded.

Evaluation of the Vulcanized-Bonded Layered Body

Peeling Test

The vulcanized-bonded layered bodies of each of the embodiments and comparative examples described above were subjected to a peeling test according to JIS K6256. The bonding strength (N/25 mm) between the H-NBR sheet or NBR sheet and the ACM sheet and the surface conditions of both sheets were evaluated. These results are shown in Table 3. In the "Bonding Strength" column of Table 3, "90<(tear)" indicates that the sheet was torn while peeling and the measurements at 90 N/25 mm or greater could not be measured. In the "Surface Conditions" column of Table 3, "surface peeling" indicates that there was peeling along the interface of the sheets without any damage to either sheet. Additionally, "rubber damage" indicates that there was damage to the sheet, i.e., a portion of the material remained on top of the companion sheet, during peeling.

Heat Resistance

The vulcanized-bonded layered body of each of the above embodiments and comparative examples were subjected to dry air aging at 150° C. for 500 hours. Then, each layered body was folded back 180°. In the "Heat Resistance of Layered Body" column of Table 3, the layered bodies that broke or had abnormalities, such as cracks or the like, are indicated by an "X", and the layered bodies that did not have any abnormalities are indicated by an "O".

Compression Set of a Vulcanized H-NBR Test Piece and a Vulcanized NBR Test Piece H-NBR non-vulcanized composition test pieces and NBR non-vulcanized composition test pieces corresponding to each of the above embodiments and comparative examples were vulcanized individually, i.e., without being affixed to ACM non-vulcanized composition test pieces. Press vulcanization at 160° C. for 45 minutes and hot air vulcanization of 160° C. for 8 hours were performed to each of the individual test pieces. The H-NBR non-vulcanized composition test pieces and NBR non-vulcanized composition test pieces were then evaluated for compression set under heat aging conditions of 150° C. for 240 hours according to JIS K6262. Test pieces that had a compression set of less than 60% are indicated by an "O", and test pieces that had a compression set of 60% or greater are indicated by an "X", as shown in the "Compression Set of H-NBR or NBR" column of Table 3.

While the preferred embodiment has been described, variations thereto will occur to those skilled in the art within the scope of the present inventive concepts which are delineated by the following claims.

What is claimed is:

1. A method of vulcanized bonding a hydrogenated acrylonitrile butadiene rubber (H-NBR) and an epoxy cross-linking type acrylic rubber (ACM), said method comprising:

mixing zinc oxide (ZnO), magnesium oxide (MgO), and H-NBR; and peroxide vulcanizing said H-NBR at the same time as vulcanized bonding said ACM wherein:

the amount of said ZnO in said mixture of H-NBR is 5 phr or greater; and the amount of said MgO in said mixture of H-NBR is 5 phr or greater.

2. A method as described in claim 1, wherein said H-NBR is a hydrogenated or partially hydrogenated unsaturated nitrile-conjugated diene copolymer rubber.

3. A method as described in claim 1, wherein said H-NBR comprises:

an unsaturated nitrile, a conjugated diene, and a hydrogenating unit portion selected from the group consisting of an ethylene unsaturated monomer other than unsaturated nitrile, conjugated diene, or a combination thereof.

4. A method as described in claim 3, wherein said H-NBR comprises:

25–45% by weight based upon the total weight of said H-NBR of said unsaturated nitrile;

5% by weight or less based upon the total weight of said H-NBR of said conjugated diene; and 50–75% by weight based upon the total weight of said H-NBR of said hydrogenating unit portion.

5. A method as described in claim 1, wherein:

said amount of ZnO in said mixture of H-NBR is 5–10 phr; and said amount of said MgO in said mixture of H-NBR is 5–15 phr.

6. A method as described in claim 1, wherein said peroxide vulcanizing of said H-NBR is organic peroxide vulcanizing.

7. A method as described in claim 6, wherein an organic peroxide used in said organic peroxide vulcanizing comprises one or more members selected from the group consisting of a monoperoxy compound and a diperoxy compound.

8. A method as described in claim 7, wherein said monoperoxy compound is selected from the group consisting of dicumyl peroxide, diacyl peroxide, di-t-butyl peroxide, t-butyl peroxide acetate, t-butyl peroxy isopropyl carbonate, and peroxy ester.

9. A method as described in claim 7, wherein said diperoxy compound is selected from the group consisting of 2,5-dimethyl-2,5-di-(t-butyl peroxy)-hexyne-3,2,5-dimethyl-2,5-di-(t-butyl peroxy)hexane,α,α'-bis(t-butyl peroxy)-p-diisopropyl benzene, and 2,5-dimethyl-2,5-di-(benzoyl peroxy)-hexane.

10. A method as described in claim 7, wherein said organic peroxide used in said organic peroxide vulcanizing is dicumyl peroxide in an amount of 0.5–8 phr.

11. A method as described in claim 1, wherein said ACM is a mixture which further comprises an ammonium salt.

12. A method as described in claim 11, wherein said ammonium salt is selected from the group consisting of:

(1) ammonium benzoate;

(2) isocyanuric acid, quaternary ammonium salt, and diphenyl urea;

(3) imidazole, thiourea, and quaternary ammonium salt; and (4) a combination of any of (1), (2), and (3).

13. A method as described in claim 11, wherein the amount of said ammonium salt is 0.1–3 phr.

14. A method as described in claim 1, wherein said ACM is a mixture which further comprises a member selected from the group consisting of silica filler, age resistor, carbon black, plasticizer, processing aid, and any combination of any of the foregoing.

15. A method as described in claim 1, wherein said H-NBR and said ACM are vulcanized bonded as one of a flat and a tube-shaped layered body.

16. A method as described in claim 1, wherein said H-NBR and said ACM are used as a layered body in an inner pipe of a hose with said H-NBR in an inner layer of said layered body and said ACM as an outer layer of said layered body.

17. A method as described in claim 16, wherein hose is a fuel hose, an oil hose, or an air hose.

18. A method as described in claim 17, wherein said fuel hose is a diesel fuel hose.

* * * * *